(12) United States Patent
Masuda et al.

(10) Patent No.: US 6,446,527 B2
(45) Date of Patent: Sep. 10, 2002

(54) LEVER APPARATUS

(75) Inventors: Kou Masuda; Takeshi Nakamura, both of Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/797,851

(22) Filed: Mar. 5, 2001

(30) Foreign Application Priority Data

Mar. 6, 2000 (JP) ........................................ 2000-060464

(51) Int. Cl.[7] .............................. B60N 2/16; F16H 21/12
(52) U.S. Cl. ........................................ 74/535; 297/366
(58) Field of Search ................................ 74/141.5, 142, 74/157, 498, 523, 530, 532, 535; 297/366, 367, 369; 192/43.1

(56) References Cited

U.S. PATENT DOCUMENTS 4,538,856 A * 9/1985 Katsumoto et al. ......... 297/367
5,865,285 A * 2/1999 Minkenberg et al. ......... 192/15

* cited by examiner

Primary Examiner—Christopher P. Schwartz
(74) Attorney, Agent, or Firm—Arent Fox Kintner Plotkin & Kahn, PLLC

(57) ABSTRACT

A lever apparatus for operating a member comprises: a supporting member; a gear rotatably supported by the supporting member around a rotation shaft and connected to the member; a lever coaxially rotatable with the rotation shaft in a normal direction and in a reverse direction from a neutral position thereof within a predetermined angle; a return spring for returning the lever to the neutral position; a latch rotatably supported by the lever around a latch shaft and transmitting a rotation of the lever to the gear and providing a torque to the gear in the normal direction or in the reverse direction according to the direction of the lever; and an engaging shaft disposed between the latch and the supporting member. The engaging shaft engages the latch with the supporting member when the lever is rotated in the predetermined angle.

7 Claims, 7 Drawing Sheets

LEVER APPARATUS

BACKGROUND OF THE INVENTION

1. Field of the Invention

The present invention relates to a lever apparatus suitable for seat lifters for automobiles.

2. Background Art

Automobiles are often equipped with seat lifters which enable adjustment of the height of seats so as to accommodate the position of drivers with respect to the steeling wheel. Seat lifters generally comprise an elevating mechanism such as a parallel link or a pantograph that supports a seat on a floor, which elevates the seat. The elevating mechanism generally operates by rotating a driving shaft which is equipped therein. Handles have been widely used as an operating device for rotating the driving shaft. The handle-type operating device directly rotates a gear which is directly connected to the driving shaft, so that the structure thereof can be simple. However, the handle-type operating device requires a large operating force, and this does not allow easy operation.

Therefore, recently, lever-type operating devices have been widely used instead of the handle-type operating devices. The lever-type operating device rotates a driving shaft of an elevating mechanism by operating a lever upward or downward. U.S. Pat. No. 5,865,285 proposes a lever apparatus having a lever which is urged in to a neutral position. When the lever is moved, the action thereof is transmitted to a driving shaft via a gear. When the lever is released, it returns to the neutral position. The transmitting member for transmitting the operating movement of the lever consists of a latch which engages with the gear only when the lever is moved upward, and another latch which engages with the gear only when the lever is moved downward. Each latch serves as a one way ratchet, and the engagement of the latch with the gear changes according to the direction of the operation of the lever.

SUMMARY OF THE INVENTION

The above-mentioned lever apparatus must have at least two latches for transmitting the upward or downward operating movement of the lever to the gear. Therefore, the apparatus may have a large number of parts and be complicated, and problems therefore readily occur.

An object of the invention is to provide a lever apparatus which can reduce the number of parts and which can be simplified, and the reliability thereof can therefore be improved.

The invention provides a lever apparatus for operating a member, the apparatus comprising: a supporting member; a gear rotatably supported by the supporting member around a rotation shaft and connected to the member; a lever coaxially rotatably with the rotation shaft in a normal direction and in a reverse direction from a neutral position thereof within a predetermined angle; a return spring for returning the lever to the neutral position; a latch rotatably supported by the lever around a latch shaft and transmitting a rotation of the lever to the gear and providing a torque to the gear in the normal direction or in the reverse direction according to the direction of the lever; and an engaging shaft disposed between the latch and the supporting member. The engaging shaft engages the latch with the supporting member when the lever is rotated in the predetermined angle. When the lever is further rotated from the condition in which the latch engages with the supporting member via the engaging shaft, the latch is rotated around the engaging shaft by the latch shaft as a force point, so that engagement of the latch with respect to the gear is changed to a condition in which the gear is rotated in the normal direction or a condition in which the gear is rotated in the reverse direction.

According to the invention, the operated movement of the lever is transmitted to the gear connected to the member via the latch. The engagement of the latch with respect to the gear is changed to the condition in which the gear is rotated in the normal direction or the condition in which the gear is rotated in the reverse direction by the engagement of the engaging shaft with the supporting member. According to the invention, one latch enables the change of the normal rotation or reverse rotation of the gear, and the number of the parts can be relatively reduced and the construction thereof can be simple.

DETAILED EXPLANATION OF THE INVENTION

An embodiment of the invention, in which the invention is applied to a seat lifter, will be explained in detail hereinafter with reference to drawings.

A. Construction of Lever Apparatus

Figure 1:
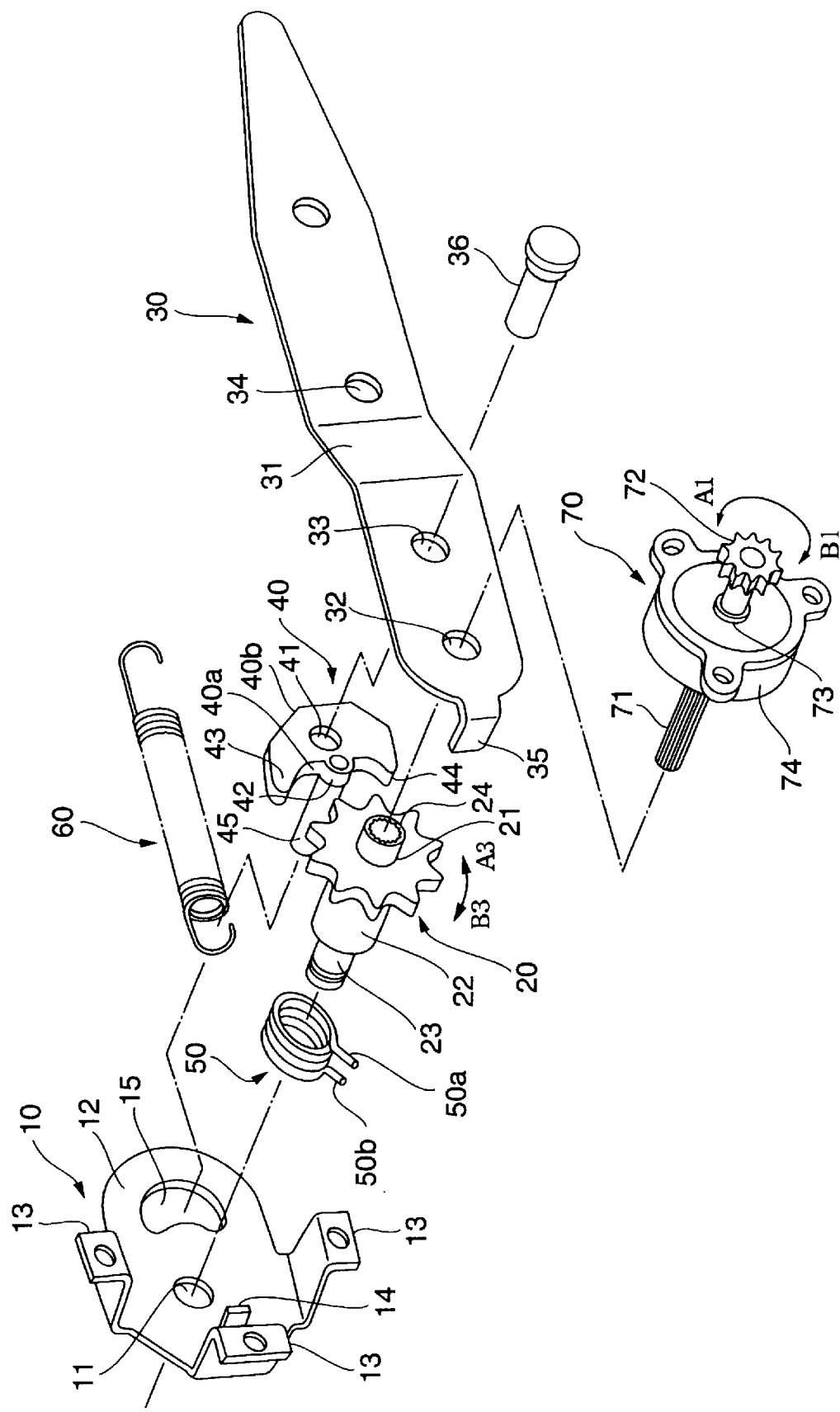
FIG. 1 is an exploded perspective view of a lever apparatus according to an embodiment of the invention.
Figure 2:
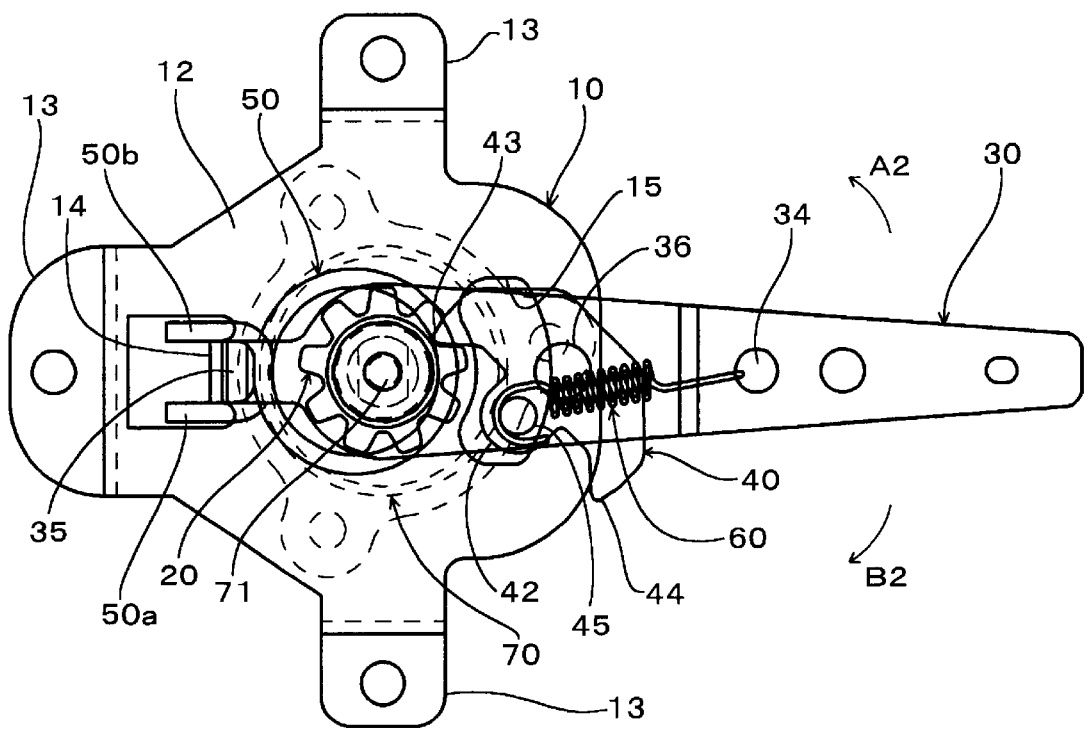
FIG. 2 is a side view of the lever apparatus according to the embodiment of the invention, which shows the condition in which the lever is positioned at a neutral position and the latch portion for upward movement engages with a gear.
Figure 3:
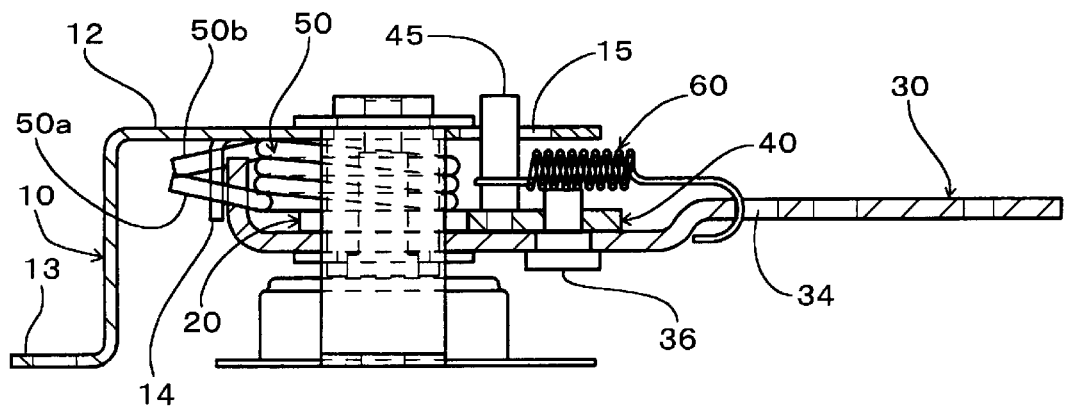
FIG. 3 is a lateral cross section of the lever apparatus according to the embodiment of the invention.

FIG. 1 shows an exploded perspective view of the embodiment, FIG. 2 is a side view showing the condition in which the lever apparatus in FIG. 1 is assembled, and FIG. 3 is a lateral cross section of FIG. 2. As shown in the figures, the lever apparatus includes a bracket 10, a gear 20, a lever 30, a latch 40, a return spring 50, and a snap ring 60. Reference numeral 70 in FIGS. 1 to 3 indicates a spring brake for transmitting the movement of the lever 30 to an elevating mechanism of the seat lifter.

As shown in FIG. 1, the bracket 10 is formed with plural (three in the embodiment) flange portions 13 serving as a mounting portion to a seat (not shown) at the peripheral portion of a plate portion 12 having a shaft hole 11. A protruding piece 14 projecting toward the gear 20 is formed in the vicinity of the center flange portion 13 at an end portion of the plate portion 12. A guide hole 15 is formed at the other end of the plate portion 12. The guide hole 15 vertically extends along an arc coaxial with the shaft hole 11. The gear 20 is rotatably inserted into the shaft hole 11 of the bracket 10 from the side to which the flange portion 13 and the protruding piece 14 project.

The gear 20 is a spur gear having rounded tooth tops and tooth spaces, and has a boss 21 at the center of an end surface. The gear 20 has a spring mounting body portion 22 and a gear shaft 23 coaxially formed at the other end surface of the gear 20. The gear shaft 23 of the gear 20 is inserted into the shaft hole 11 of the bracket 10 so as to be rotatable and so as not to be separate therefrom. The return spring 50 is wound around the spring mounting body portion 22 of the gear 20. The return spring 50 is a torsion coiled spring, and as shown in FIG. 2, the arm portions 50a and 50b hold the protruding piece 14 of the bracket 10 and an engaging piece 35 (described later) of the lever 30.

The boss 21 of the gear rotatably supports the lever 30. The lever 30 is made from a steel sheet into a plate, and has a crank-shaped bent portion 31 at the intermediate portion in the longitudinal direction. The left end of the lever 30 in FIGS. 1 to 3 has a base end at which a shaft hole 32 is formed. In the lever 30, a pin hole 33 is formed in the vicinity of the shaft hole 32, and a spring mounting hole 34 is formed in the vicinity of the bent portion 31 and in the front side thereof (right side in FIGS. 1 to 3). The base end of the lever 30 is formed with the engaging piece 35, which is bent toward the bracket 10. The shaft hole 32 of the lever 30 is rotatably fit with the boss 21 of the gear 20. In this condition, the engaging piece 35 of the lever 30 is located between arm portions 50a and 50b of the return spring 50 as shown in FIG. 2, and between the protruding piece 14 of the bracket 10 and the coiled portion of the return spring 50, as shown in FIG. 3. A gripping member (not shown) may be mounted at the front end of the lever 30.

A latch pin 36 is inserted into the pin hole 33 of the lever 30 from the opposite side of the bracket 10. The latch pin 36 is secured to the lever 30 by means of welding, or the like. The latch pin 36 projects from the lever 30 toward the bracket 10, and the latch 40 is rotatably mounted to the projected portion of the latch pin 36.

As shown in FIG. 1, the latch 40 has a symmetrical shape like a crescent moon including a concave circumference 40a and convex circumference 40b. A pin hole 41 is formed at the center of the latch 40. A protrusion 42 is formed at the center of the concave circumference 40a. The ends of the latch 40 are formed into a triangle protrusion having a relatively sharp edge, and the upper end (in FIGS. 1 and 2) is up-latch portion 43 and the lower end (in FIGS. 1 and 2) is down-latch portion 44. The protrusion 42 is secured to an end of an engaging pin 45 extending toward the bracket 10 in parallel with the latch pin 36.

The latch 40 is rotatably mounted to the bracket 10 around the latch pin 36 by inserting the latch pin 36 into the pin hole 41. In this condition, the engaging pin 45 is inserted into a guide hole 15 of the bracket 10, as shown in FIG. 3. The lever 30 has a spring engaging hole 35, to which the end of the snap spring 60 is hooked. The other end of the snap spring 60 is hooked to the engaging pin 45. In FIGS. 4 to 9, description of the snap spring 60 is omitted.

As shown in FIG. 1, the spring brake 70 consists of an input shaft 71 formed with a spline on outer surface thereof, an output shaft 73 having a driving gear 72, and a braking mechanism 74 located between the shafts 71 and 73. The braking mechanism 74 prevents rotation of the output shaft 73 when a rotation torque is exerted thereto, and connects the shafts 71 and 73 and allows the rotation thereof when a rotation torque is exerted to the input shaft 71. That is, although the output shaft 73 rotates in the same direction of the input shaft 71 according to the rotation thereof, the output shaft 73 and the input shaft 71 do not rotate when the output shaft 73 is intended to rotate.

The input shaft 71 of the spring brake 70 is fit into an internal gear 24 formed in the boss 21 of the gear 20, so that the rotation of the gear 20 is transmitted to the output shaft 73 via the input shaft 71. The driving gear 72 of the output shaft 73 is connected to a driving shaft which drives an elevating mechanism of a seat lifter (both not shown). The seat moves upward when the driving gear 72 is rotated in the direction indicated by the arrow A1 in FIG. 1, and the seat moves downward when the driving gear 72 is rotated in the direction indicated by the arrow B1. The description of the output shaft 73 and the driving gear 72 is omitted in FIG. 3.

B. Operation of Lever Apparatus

The operation of the above-described lever apparatus will be explained hereinafter.

Figure 6:
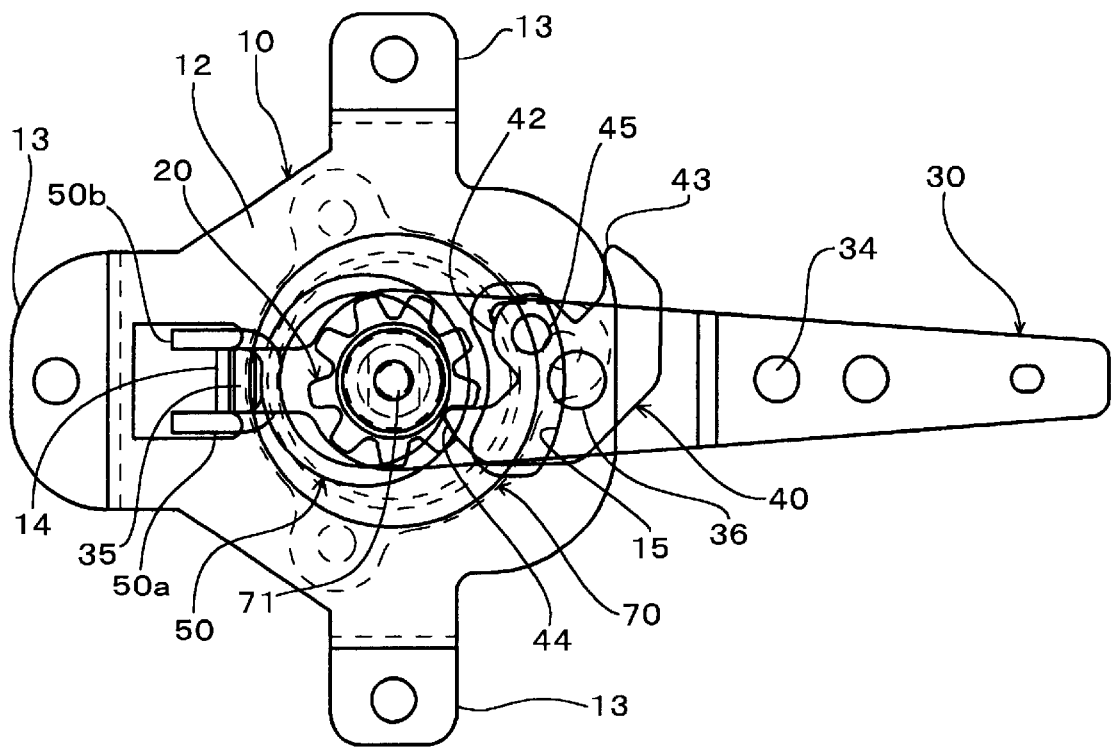
FIG. 6 is a side view of the lever apparatus according to the embodimen of the invention, which shows the condition in which the lever is at the neutral position and the down latch portion engages with the gear.

The lever 30 can be rotated upward or downward around the boss 21 of the gear 20. When the force for the rotation is released, the lever 30 is returned to the approximately horizontal neutral position by the return spring 50. The latch 40 is then in one of two conditions in which the up-latch portion 43 engages with the gear 20 or the down-latch portion 44 engages the gear 20 according to the operation of the lever 30, and the condition is maintained by the snap spring 60. FIG. 2 shows the condition in which the up-latch portion 43 of the latch 40 engages with the gear 20 after the lever 30 is rotated upward. FIG. 6 shows the condition in which the down-latch portion 44 of the latch 40 engages with the gear 20 after the lever 30 is rotated downward. The lever 30 is rotated upward when the seat is moved upward, and the lever 30 is rotated downward when the seat is moved downward. The movement of the seat from the condition in FIG. 2 will be explained hereinafter.

Figure 4:
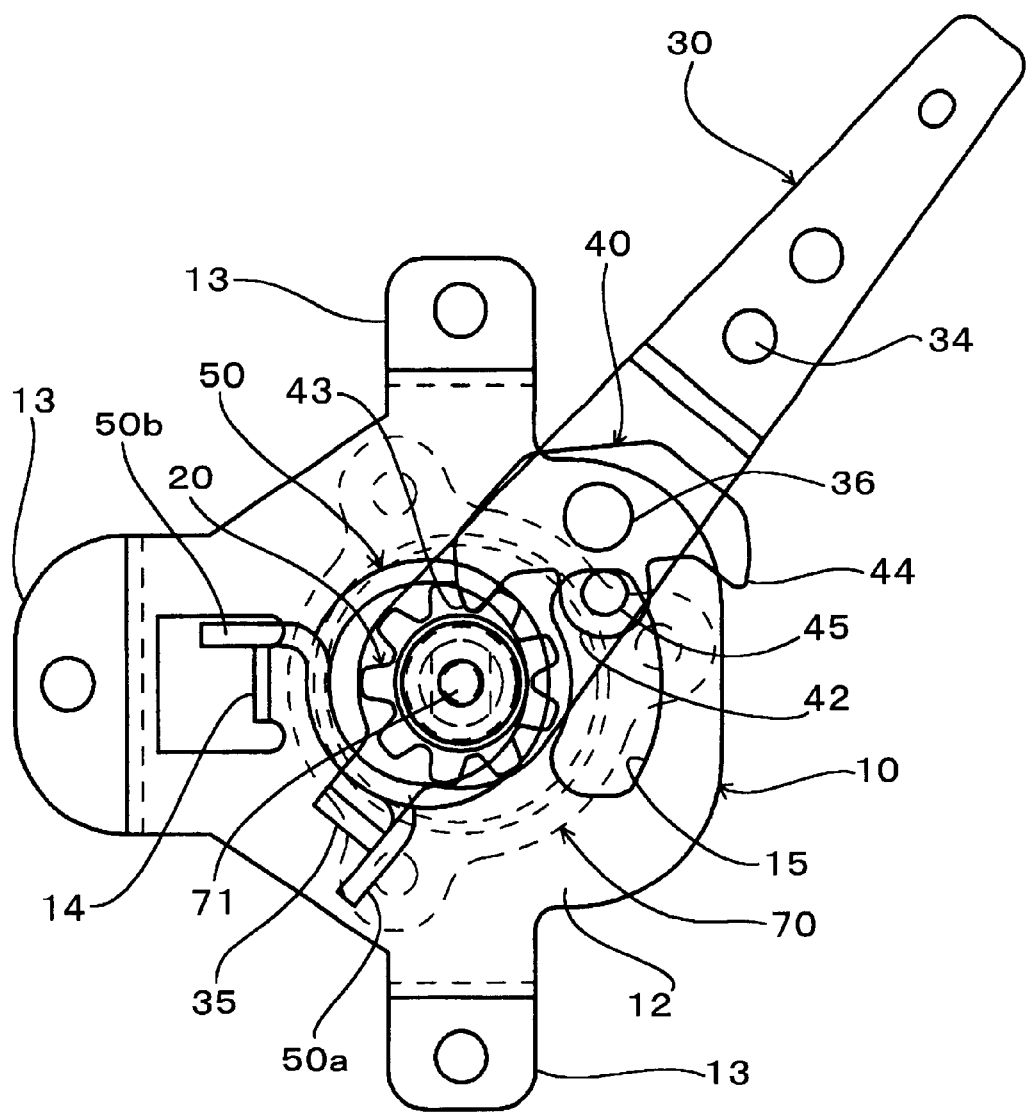
FIG. 4 is a side view of the lever apparatus according to the embodiment of the invention, which shows the condition in which the lever is rotated upward in the full stroke from the condition in FIG. 2.
Figure 5:
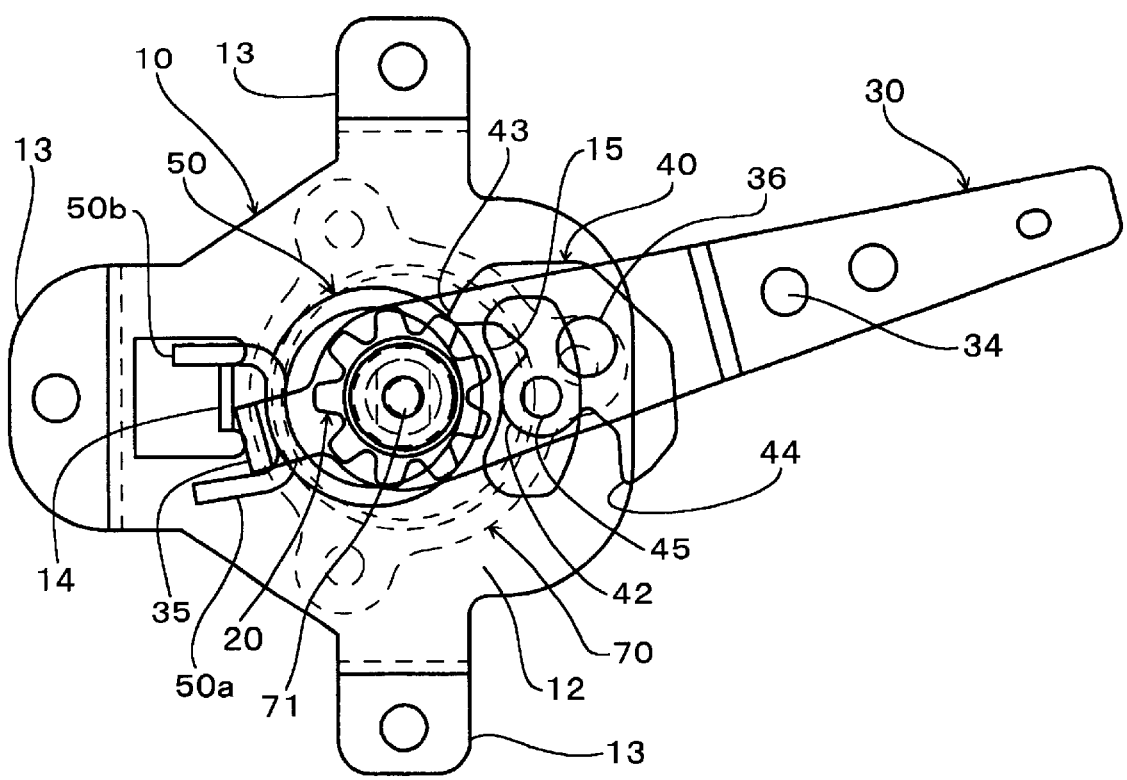
FIG. 5 is a side view of the lever apparatus according to the embodiment of the invention, which shows the condition in which the lever is released and is returning to a neutral position from the condition in FIG. 4.

When the lever 30 is manually rotated upward in the direction indicated by the arrow A2 from the condition in FIG. 2, the rotation torque is transmitted to the gear 20 via the latch 40, and the gear 20 rotates in the same direction of that of the lever 30 (in the direction indicated by the arrow A3 in FIG. 3). The rotation of the gear 20 is transmitted to the output shaft 72 and the driving gear 72 via the input shaft 71 of the spring brake 70, so that the seat moves upward. As shown in FIG. 4, the rotation of the lever 30 is restricted to the position where the engaging pin 45 comes into contact with the upper edge of the guide hole 15 of the bracket 10. When the lever 30 is rotated upward, the engaging piece 35 thereof thrusts and moves downward the one arm portion 50a of the return spring 50, so that an elastic force for returning the lever 30 to the neutral position occurs.

When the lever 30 is released from the hand after the lever 30 is moved in the full stroke, the lever 30 downwardly rotates by itself and returns to the neutral position by the action of the return spring 50. In this movement, the up-latch portion 43 of the latch 40 is upwardly urged to the gear 20 by the function of the snap spring 60, so that the up-latch portion 43 does not engage with the gear 20 and passes thereover. Therefore, the lever 30 can return to the neutral position shown in FIG. 2. The seat can be adjusted to the required height by repeating the above-described operation. It should be noted that the load exerted by the seat is not transmitted to the input shaft 71 by the function of the braking mechanism of the spring brake 70, so that the gear 20 is not reversed when the lever 30 is released and the force for supporting the gear 20 is extracted.

Figure 7:
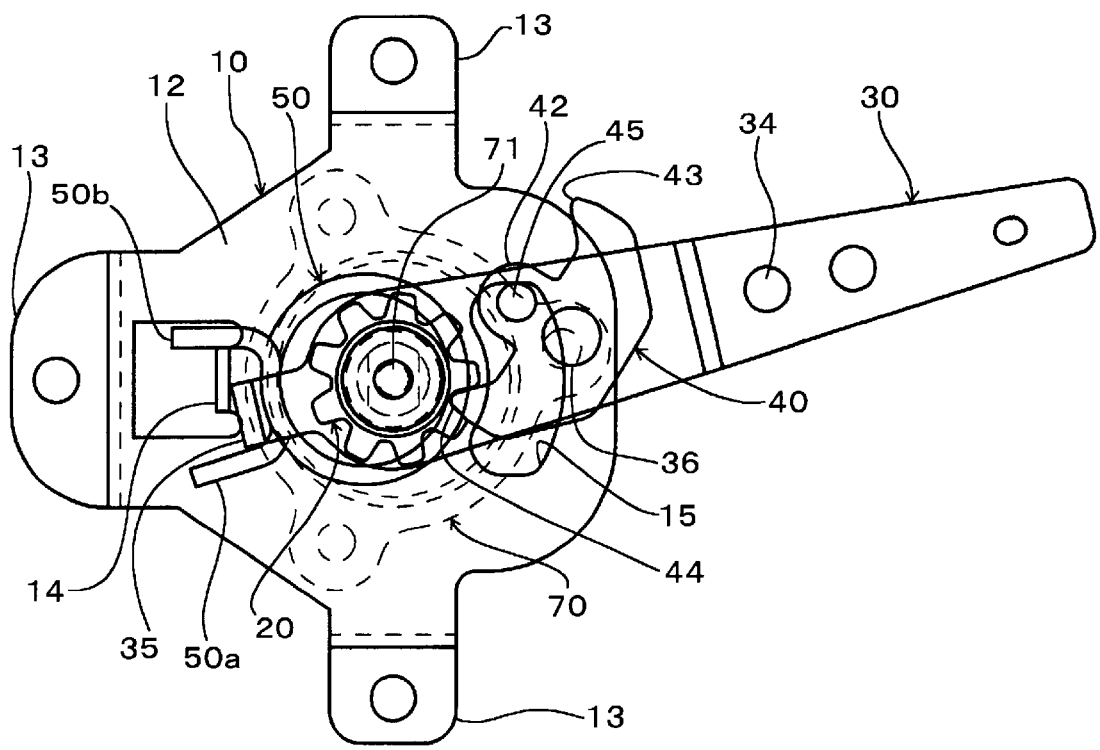
FIG. 7 is a side view of the lever apparatus according to the embodiment of the invention, which shows the condition in which the lever is operated upward from the condition in FIG. 6.
Figure 8:
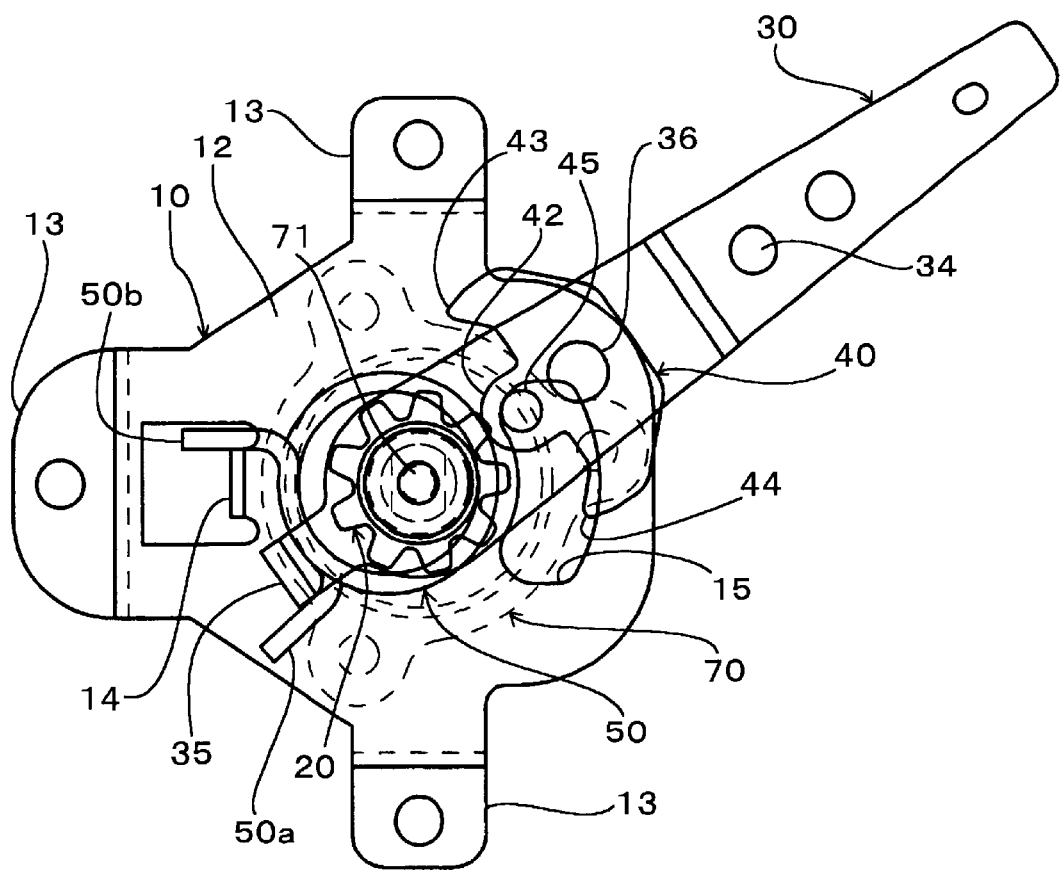
FIG. 8 is a side view of the lever apparatus according to the embodiment of the invention, which shows the condition in which the lever is further operated upward from the condition in FIG. 7.
Figure 9:
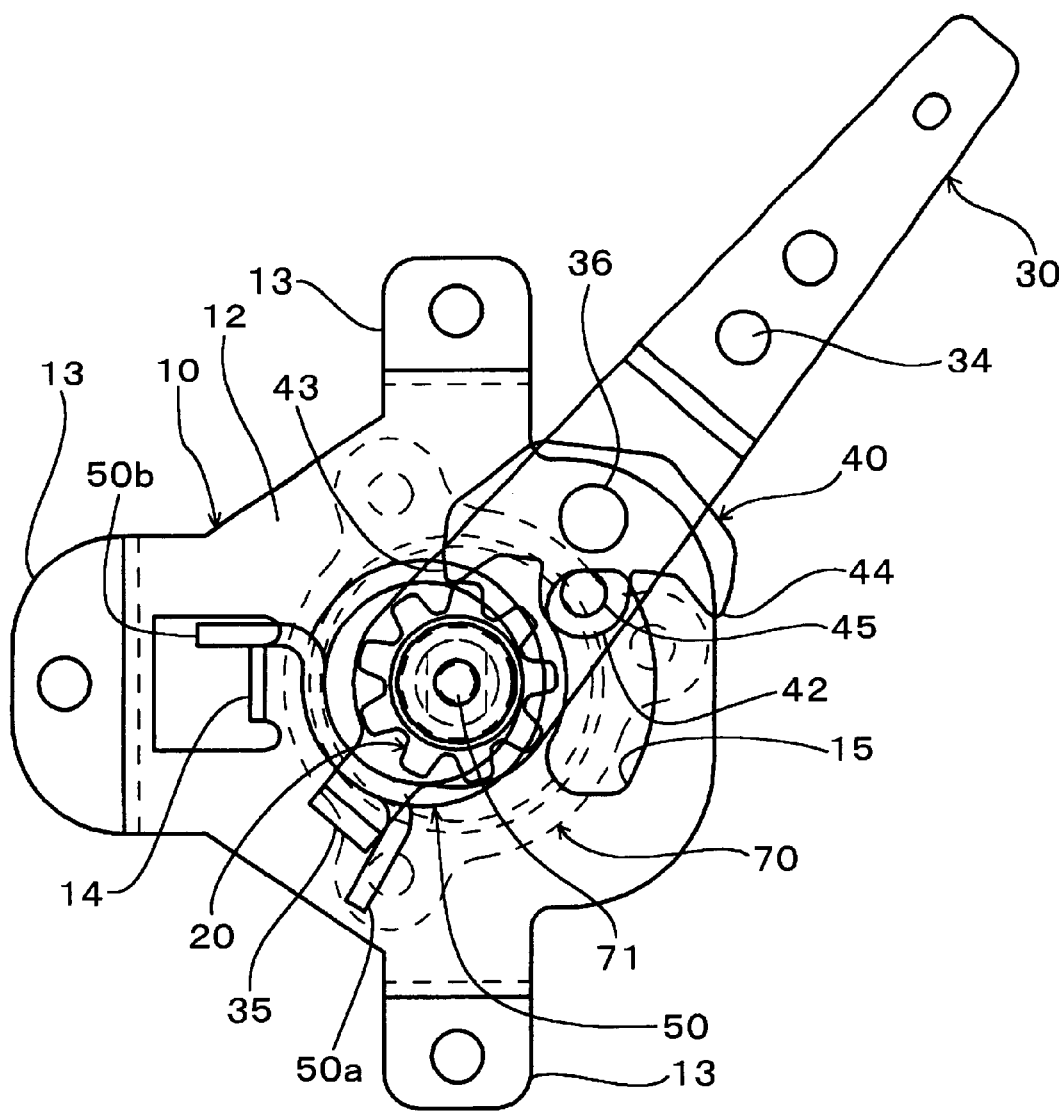
FIG. 9 is a side view of the lever apparatus according to the embodiment of the invention, which shows the condition in which the lever is further operated upward from the condition in FIG. 8.

Then, the upward movement of the seat from the condition in FIG. 6 in which the down-latch portion 44 of the latch 40 engages with the gear 20 will be explained hereinafter. The lever 30 can be rotated upward from the condition in FIG. 6 since the down-latch portion 44 passes over the gear 20, and then the engaging pin 45 comes into contact with the upper edge of the guide hole 15 of the bracket 10, as shown in FIG. 7. When the lever 30 is further rotated upward opposing the elastic force of the snap spring 60, the latch 40 is rotated counterclockwise around the engaging pin 45 by the latch pin 36 as a force point as shown in FIGS. 8 and 9, so that the up-latch portion 43 of the latch 40 engages with the gear 20. In this movement, the snap spring 60 operates a snap function in which it is extended to the maximum and passes the change point thereof; it then returns to the previous condition, so that the snap spring 60 moves to the position where it maintains the condition in which the up-latch portion 43 engages with the gear 20. The position of the lever 30 in FIG. 8 shows the position of the change point in which the snap spring 60 is extended to the maximum.

Thus, the engagement of the latch 40 with respect to the gear 20 is changed to the up-latch portion 43. Afterward, the lever 30 is once released and it returns to the neutral position (the condition in FIG. 2), and the operation for upward movement of the seat is performed.

Next, the downward movement of the seat from the condition in FIG. 2, that is, the condition after the upward movement of the seat, will be explained. The lever 30 can be rotated downward from the condition in FIG. 2 since the up-latch portion 43 passes over the gear 20, and then the engaging pin 45 comes into contact with the lower edge of the guide hole 15 of the bracket 10. When the lever 30 is rotated downward, the engaging piece 35 thereof thrusts and moves upward the other arm portion 50b of the return spring 50, so that an elastic force for returning the lever 30 to the neutral position occurs. From this condition, when the lever 30 is further rotated downward opposing the elastic force of the snap spring 60, the latch 40 is rotated clockwise in FIG. 2 around the engaging pin 45 by the latch pin 36 as a force point, so that the down-latch portion 44 of the latch 40 engages with the gear 20. In this movement, the snap spring 60 operates a snap function in which it is extended to the maximum and passes the change point thereof; it then returns to the previous condition, so that the snap spring 60 moves to the position where it maintains the condition in which the down-latch portion 44 engages with the gear 20.

Thus, the engagement of the latch 40 with respect to the gear 20 is changed to the down-latch portion 44. Afterward, the lever 30 is once released and it returns to the neutral position, and the operation for downward rotation of the lever 30 is repeated. Therefore, the gear 20 rotates in the direction indicated by the arrow B3 in FIG. 1, and the seat is moved downward by the opposite movement to that of the upward movement.

In the embodiment, the operated movement of the lever 30 is transmitted to the driving gear 72 of the spring brake 70, which is connected to the elevating mechanism of the seat lifter, via the latch 40 and the gear 20. The engagement of the latch 40 with respect to the gear 20 can be changed to the condition for normal or reverse rotation thereof according to the direction of the lever 30 by further operating the lever 30 from the condition in which the engaging pin 45 engages with the upper edge or the lower edge of the guide hole 15 of the bracket 10. According to the embodiment, one latch 40 enables the change of the normal rotation or reverse rotation of the gear 20. Therefore, in the embodiment, the number of the parts can be relatively reduced and the construction thereof can be simple, and problems are therefore reduced and high reliability can be obtained.

It should be noted that application of the lever apparatus of the invention is not limited to seat lifters, the lever apparatus can also be applied to various types of mechanisms in which the movement direction is changed according to the operation direction of a lever.

What is claimed is:

1. A lever apparatus for operating a member, the apparatus comprising:

a supporting member;

a gear rotatably supported by the supporting member around a rotation shaft and connected to the member;

a lever coaxially rotatable with the rotation shaft in a normal direction and in a reverse direction from a neutral position thereof within a predetermined angle;

a return spring for returning the lever to the neutral position;

a latch rotatably supported by the lever around a latch shaft and transmitting a rotation of the lever to the gear and providing a torque to the gear in the normal direction or in the reverse direction according to the direction of the lever; and an engaging shaft disposed between the latch and the supporting member;

wherein the engaging shaft engages the latch with the supporting member when the lever is rotated in the predetermined angle;

when the lever is further rotated from the condition in which the latch engages with the supporting member via the engaging shaft, the latch is rotated around the engaging shaft by the latch shaft as a force point, so that engagement of the latch with respect to the gear is changed to a condition in which the gear is rotated in the normal direction or a condition in which the gear is rotated in the reverse direction.

2. A lever apparatus according to claim 1, wherein the return spring is a torsion coiled spring mounted to the rotation shaft.

3. A lever apparatus according to claim 2, wherein the return spring comprises two end portions extending in the same direction, the supporting member comprises a protruding piece located between the end portions, the lever comprises an engaging piece located between the end portions.

4. A lever apparatus according to claim 1, wherein a snap spring is mounted between the engaging shaft and the lever so as to provide a tension force therebetween, the snap spring urges the latch so as to engage the latch with the gear.

5. A lever apparatus according to claim 4, wherein the lever has an engaging portion for mounting the snap spring, the engaging portion, the rotation shaft of the gear, and the latch shaft are straightly aligned.

6. A lever apparatus according to claim 5, wherein the engaging shaft is offset from the alignment of the engaging portion, rotation shaft of the gear, and the latch shaft when the latch engages with the gear, so that elastic force of the snap spring urges the engagement of the latch and the gear.

7. A lever apparatus according to claim 1, wherein rotation of the rotation shaft is transmitted to the member via a spring brake, the spring brake comprises an input shaft, an output shaft, and a braking mechanism, the braking mechanism transmits the rotation of the input shaft to the output shaft, and cramps the input shaft or the output so as to prevent rotation thereof when a rotation torque is exerted to the output shaft.

* * * * *